United States Patent
Bathla et al.

[15] 3,677,334
[45] July 18, 1972

[54] REMOTE ACCUMULATOR CHARGE INDICATOR

[72] Inventors: Pritam S. Bathla; Carl E. Simmons, both of Dayton, Ohio

[73] Assignee: United Aircraft Products, Inc., Dayton, Ohio

[22] Filed: Dec. 30, 1970

[21] Appl. No.: 102,777

[52] U.S. Cl. ..................165/11, 62/129, 73/345, 73/389, 73/398 AR, 137/552, 138/31, 340/233
[51] Int. Cl. .............................................................. F28f
[58] Field of Search .................. 62/129; 165/11; 137/552; 73/345, 389, 398 AR; 340/229, 233, 236, 420; 138/31

[56] References Cited

UNITED STATES PATENTS

| | | | |
|---|---|---|---|
| 3,410,102 | 11/1968 | Karsten | 62/129 |
| 3,559,727 | 2/1971 | Hill et al. | 165/11 |
| 3,419,214 | 12/1968 | Evalds | 340/233 X |
| 3,258,655 | 6/1966 | Pinckaers | 317/132 X |
| 2,091,848 | 8/1937 | Eggers | 73/345 |
| 3,494,196 | 2/1970 | Moussette | 340/233 X |
| 2,454,288 | 11/1948 | Michaelson | 340/420 X |
| 2,553,291 | 5/1951 | Barr | 340/236 |

Primary Examiner—William F. O'Dea
Assistant Examiner—P. D. Ferguson
Attorney—J. E. Beringer

[57] ABSTRACT

An accumulator-reservoir device, used in a system circulating a liquid coolant or the like, in which a biased pressure applying member moves to reflect changing temperature induced density of the coolant. A remote indicator signals that the system has attained a properly charged condition, or that it has failed to remain fully charged. Electrical controls including variable resistors responding to changes in system temperature and to movement of the piston comprise a triggering circuit. Other controls including a signaling means and a gated Silicon Controlled Rectifier comprise a signaling circuit activated and deactivated by the triggering circuit.

7 Claims, 3 Drawing Figures

Patented July 18, 1972
3,677,334
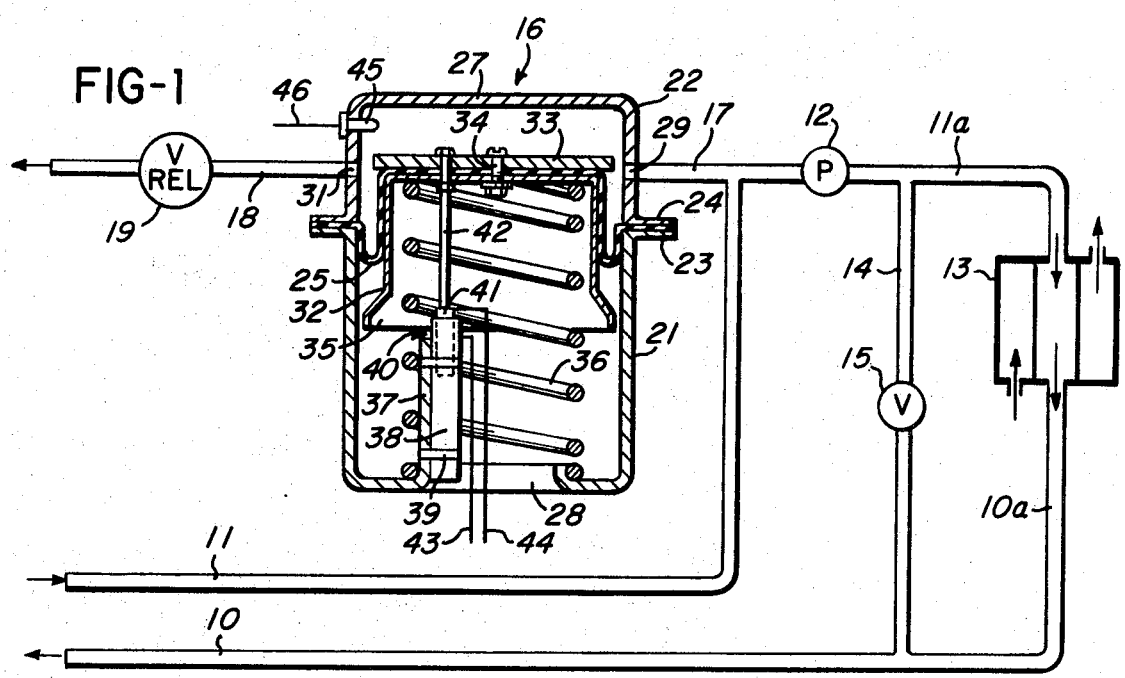
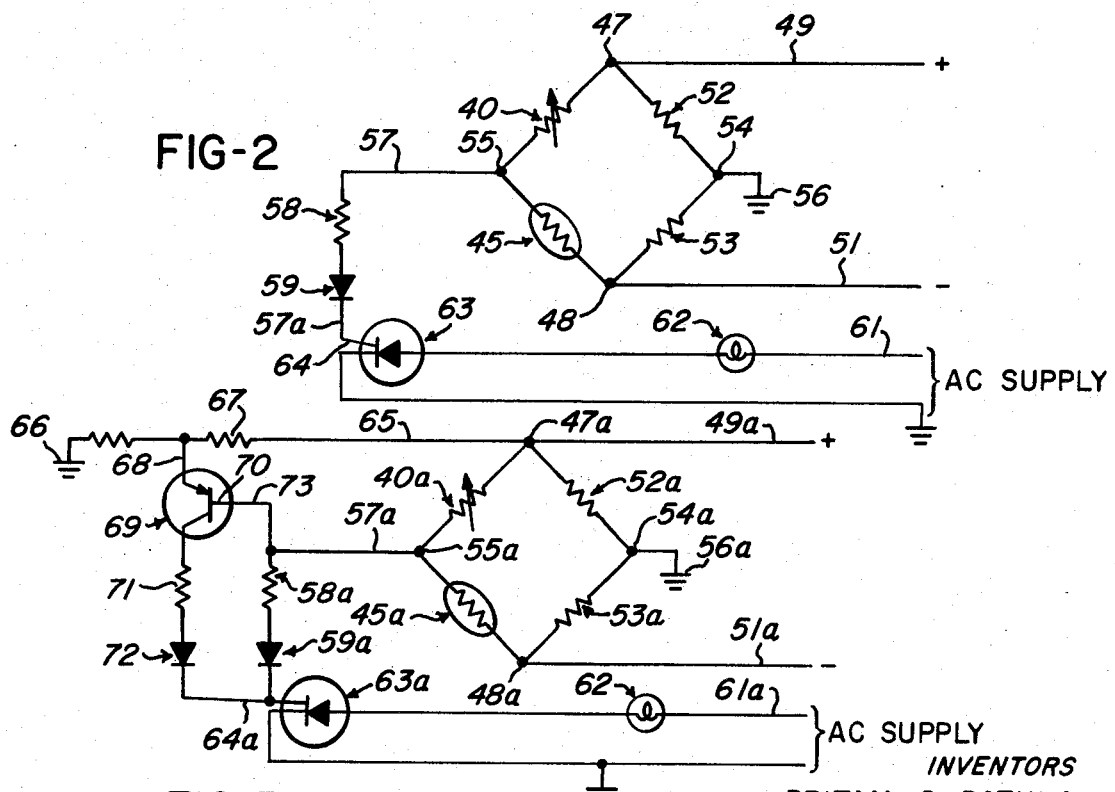
INVENTORS
PRITAM S. BATHLA
CARL E. SIMMONS
BY
THEIR ATTORNEY

REMOTE ACCUMULATOR CHARGE INDICATOR

BACKGROUND OF THE INVENTION

This invention relates to system circulating and cooling a liquid coolant, or the like, and particularly to accumulator-reservoir devices therein maintaining pressure in the system and accommodating temperature induced expansion and contraction of the coolant.

Although not so limited, the invention has especial application to aircraft and like installations wherein a cooling system may require relatively frequent recharging an in which it may be subject to widely different ambient temperatures. In the changing or recharging of a system as described, it is necessary to add coolant in an amount which will insure adequate expansion space under maximum expected temperature conditions and which will insure adequate pressurization under minimum expected temperature conditions. This amount is variable depending upon the existing ambient temperature. As a result over and under pressurization of a cooling system are possible, tending to cause damage or misoperation or both. An accumulator-reservoir device has heretofore been known which provides a continuous indication of expansion volume actually in use in the accumulator device and simultaneously to compare such amount with an amount proper for the existing coolant temperature. The prior art device, however, requires access to and direct reading of the accumulator device. Means remotely to indicate that properly charged condition of the system has been attained, or that the system has failed to retain a proper charge, have heretofore been unknown in a form related to volume compensated temperature.

SUMMARY OF THE INVENTION

The present invention features indirect indication of the accumulator charge. It provides a suitable signaling device, for example an electric light, located at, near or remotely of the accumulator itself. Direct observation of the accumulator or the reading of scales are unnecessary, either in the initial charging and recharging of the system or in the apprising of a lost charge. An electronic system operates in conjunction with the accumulator. It comprises two electrical circuits. Circuit No. 1 contains an electric signal light, a gated Silicon Controlled Rectifier (hereinafter referred to as the SCR device), and necessary switches and alternating power sources for operation. Circuit No. 2 contains an electrical bridge made up of a thermistor, a slide wire potentiometer and two matched resistors, as well as an energizing D.C. power source. The thermistor is arranged to sense system fluid temperature and the potentiometer is arranged to be influenced by changing position of the accumulator piston as influenced by the change of system fluid volume associated with a temperature change. Circuit No. 2 acts as a trigger to supply gate voltage to the SCR device and thereby activate Circuit No. 1. In an alternate form of the invention, the triggering circuit is expanded to the end that a deactivated signaling circuit may be reactivated should charging of the system be inadvertently continued beyond a condition of correct or full charge.

An object of the invention is to provide an accumulator charge indicator characterized as in the foregoing and lending itself to simplified, inexpensive installation in either new or existing systems utilizing the accumulator-reservoir concept of maintaining pressure in a circulating coolant loop or the like.

Other objects and structural details of the invention will appear from the following description, when read in connection with the accompanying drawings, wherein:

FIG. 1 is a diagram of a cooling system, incorporating accumulator-reservoir means, and a charge indicator therefor, in accordance with an illustrated embodiment of the invention;

FIG. 2 is a wiring diagram showing the arrangement of the electrical components comprised in the indicator system; and FIG. 3 is a view like FIG. 2, showing an alternate arrangement of electrical components extending the capabilities of the indicator system.

Referring to the drawings, the illustrated system circulates liquid coolant for cooling purposes, as for example to cool electronic equipment in aircraft. The system circulates an appropriate liquid coolant through the electronic equipment or other heat producing source, where it absorbs generated heat. From the heat source, the coolant is directed to the cooling system where heat is rejected in a suitable heat transfer device to air, other liquid or to someother medium acting as a heat sink. The coolant is then returned to the heat source where it absorbs additional heat and is again returned for cooling, the process involving a closed flow circuit in which a pump maintains continuous circulation of the flowing coolant.

Referring to the diagrammatic illustration of FIG. 1, liquid coolant is directed to a heat source by way of a conduit 10 and returns therefrom by way of a conduit 11. The latter extends to the suction side of a pump 12, the pressure side of which is connected by a conduit extension 11a to one side of a heat exchanger 13. Within heat exchanger 13 the coolant is brought into heat transfer relation to another, relatively cooler fluid and is continuously directed through and beyond the heat exchanger by conduit means 10a leading to and forming a part of conduit 10. The conduits 11a and 10a may be suitably bridged by a line 14 constituting a by-pass around heat exchanger 13. A valve 15 in the by-pass opens and closes flow therethrough and may be constructed for automatic operation, as for example in response to changing temperature values of the circulating coolant.

An accumulator-reservoir 16 is placed in communication with the suction side of pump 12 by a fluid flow line 17 opening into conduit 11. The device 16 provides interior space for expansion of the coolant when increasing temperature brings about a decreasing density thereof. Also, pressure applying means within the accumulator device maintains pressure in the system. An increasing density of the coolant thus will not allow the pump suction pressure to fall below the desired value, since whatever loss of pressure occurs is compensated for by movement of the pressure applying means. An outlet connection 18 in which is a pressure relief valve 19 obviates the attainment of pressure values in the accumulator device higher than a predetermined value as set by the valve 19.

As shown, in its illustrative embodiment, the device 16 comprises cup-shaped housing sections 21 and 22. On open, opposing ends of the respective housing sections are circular flanges 23 and 24. In assembly of the housing, the flanges are brought to a face-to-face relation and clamped together by a suitable bolt circle. At the joint between housing sections 21 and 22 in a flexible diaphragm 25, a peripheral edge of which is received between the flanges 23 and 24 and clamped therebetween by the bolt circle. The arrangement is one positively to seal opposite end portions of the interior of device 16 from one another. For convenience of illustration, the device 16 has been shown in an upright position with a lowermost chamber 26 in housing section 21 and an uppermost chamber 27 in housing section 22. The accumulator-reservoir device is capable, however, of functioning in a variety of attitudes. The lower chamber 26 is vented by an opening 28 in the base of section 21. Upper chamber 27 serves as the pressure chamber, an opening 29 therein communicating with line 17 of the coolant circulating system. A similar opening 31 communicates with outlet connection 18.

A piston element 32 is clamped to one side of the diaphragm 25 to project reversely into vented chamber 26, the clamping mean including a reactant plate 33 on the other side of the diaphragm and interconnecting bolt means 34. The outer projecting end of the piston 32 is formed as an expanded portion 35 achieving an adjacent, guided relation to the interior wall of housing section 21. The diaphragm 25 is flexible and is mounted over the piston and forms itself to be capable of longitudinal deflection within the accumulator device.

The diaphragm 25 and connected parts form a pressure applying member capable of relative longitudinal motion within the device 16. A compression spring 36 is based on the closed interior end of housing section 21 and is received at its other end within piston 32 to engage the closed inner end thereof. The spring applies a pressure in opposition to fluid pressure in the chamber 27. The diaphragm 25, and connected parts, tends to assume a position in which the opposing pressures are balanced. In the initial charging of the system, or in recharging, coolant under pressure is admitted to the system in a suitable manner. As the pressure within chamber 27 rises, piston 32 is displaced, deflecting spring 36. The density of the coolant changes with changes in temperature and the coolant system is properly charged when the spring 36 has been deflected sufficiently that at a minimum temperature value in an expected temperature range sufficient thrust will remain in the spring 36 to continue to apply pressure in chamber 27 but not deflected so much that full displacement of the piston as occurs at a maximum temperature value in the expected temperature range cannot be accommodated. The instant invention provides indicator means whereby arrival of the system at a proper charge may be suitably signaled and whereby a lost charge similarly may be signaled.

In adapting an accumulator-reservoir device for use with such an indicator, a part of the rim defining opening 28 is extended upward as a mounting flange 37. A cylinder 38 housing an electrical coil (not shown) is mounted to the flange 37 by straps 39. An electrically conductive piston 41 is received in cylinder 38 and is reciprocable within the wire coil therein. Piston 41 is attached to a rod 42 extending upward out of cylinder 38 and suitably fixed at its upper end to the cylinder 32 and to the reactant plate 33 mounted to the cylinder. A pair of electrical conductors 43 and 44 attach respectively to the coil in cylinder 38 and to piston 41. The construction and arrangement of parts, it will be recognized, is one to provide a potentiometer, wherein the resistance varies with movement of piston 32. Further comprised in the indicator apparatus is a thermistor 45 installed in the wall of housing section 22 to project into pressure chamber 27 and sense the temperature of the fluid therein. An electrical conductor 46 extends from thermistor 45 externally of the accumulator-reservoir device. The thermistor 45 is a known device which has electric resistance characteristics changing with changes in sensed temperature. The resistance-temperature characteristics of the device are predetermined and a device suitable for present purposes in one in which resistance either increases or decreases in direct proportion to temperature rise.

As seen, the position of piston 32 is a function of fluid temperature since the piston adjusts within the accumulator responsive to changing fluid density as effected by temperature change. Accordingly, since the piston 41, representing the slider of the potentiometer, is fixed to move with the piston 32, the resistance of the potentiometer coil changes with piston movement. The potentiometer resistance is so selected that it matches the resistance-temperature characteristics of the thermistor used. Since both the thermistor and potentiometer resistances are functions of fluid temperature, the relationship between them may be used to bring about an indicating function.

In the indicator system, as shown in FIG. 2, the potentiometer, which for convenience is here designated 40, and the thermistor 45 are caused to occupy different legs on the same side of an electrical bridge. Diametrically opposed terminals 47 and 48 of the bridge are connected by conductors 49 and 51 to opposite sides of a direct current source. Matched resistors 52 and 53 make up other legs of the opposite side of the bridge and other diametrically opposed terminals 54 and 55 complete the bridge. Terminal 54 is connected to ground 56. A conductor 57 extending from terminal 55 contains a resistor 58 and a diode 59. The electrical bridge and associated connections, including conductor extension 57, forms a first electrical circuit. A second circuit comprises a conductor 61 extending from an alternating current supply. In the conductor 61 is an energizable signaling device, in the illustrate instance a bulb 62, and also an SCR device 63, light 62 and device 63 being in a series relation. The two circuits are joined in that conductor extension 57 continues beyond diode 59 as a further extension 57a and leads to the gate 64 of SCR device 63. Conventional on-off switches and other controls which might be provided for auxiliary or accessory purposes have been omitted from the wiring diagram in the interest of simplicity.

The SCR device functions in the present instance as a power switch. In accordance with its known construction, it is normally turned off and blocks flow through conductor 61 and under these conditions light 62 is extinguished. The device is turned on by conducting current at adequate voltage to the gate 64 and when this occurs the device is triggered into conduction (turned on) and allows current flow through conductor 61.

In an uncharged condition of the coolant loop, piston 32 is fully extended by spring 36 and piston 41 occupies what may be considered a fully retracted position in cylinder 38. The resistance of the potentiometer coil accordingly is at this time low. The resistance of thermistor 45 will ordinarily be higher since it reflects fluid temperature which will normally be at ambient temperature values. Accordingly, the electrical bridge is unbalanced and direct current is allowed to flow from terminal 55 through conductor 57 and extension 57a to the gate 64 of SCR device 63. The latter is activated thereby and functions as a diode, allowing current to flow freely through light 62. The latter accordingly is "on" and signals to an observer that the coolant loop is not fully charged. As charging of the system begins, pressure is applied in chamber 27 and piston 32 is displaced, compressing spring 36. Rod 42 and piston 41 are in a following relation to the piston 32 and accordingly move axially of cylinder 38 and inwardly thereof to advance the piston within the contained electrical coil. As the volume of chamber 27 increases, therefore, the resistance of the potentiometer coil increases. As charging proceeds, light 62 remains on until the charge point is reached. Thus, as the piston 41 continues in a telescoping relation to cylinder 38 potentiometer resistance increases until at some point in the travel of piston 32 potentiometer resistance equals thermistor resistance. When this occurs, the electrical bridge of which potentiometer 40 and thermistor 45 are a part is balanced. The potential at terminal 55 is equal to the potential at terminal 54, which is always at ground level. As such the flow from terminal 55 ceases and the application of gate voltage to the SCR device is discontinued. The latter returns to an inactivated state, blocking current flow through conductor 61. Light 62 goes off. The extinguishing of light 62 signals to the observer that the system is properly charged and the addition of coolant to the system accordingly is discontinued. In a normal use of the system the light 62 will stay out since the system operates in a closed or sealed condition. Piston 32 will, of course, make movements of adjustment and accommodation in the accumulator during operation of the system since changing ambient temperatures will increase and decrease coolant density. In response thereto piston 41 will move to vary potentiometer resistance. However, these variations in potentiometer resistance are matched by variation in thermistor resistance since the latter also is responsive to changes in fluid temperature. For example if the fluid temperature goes up the electrical resistance of the thermistor 45 will go up. At the same time density of the fluid decreases and the fluid expands. To accommodate fluid expansion the piston 32 moves downward. Rod 42 and piston 41 also move down in effect increasing the electrical resistance of the potentiometer. The potentiometer and the thermistor are so matched that increase of electrical resistance in both is equal over the same temperature change. Since the change in electrical resistance of both is the same, the resistance of the thermistor is equal to the resistance of the potentiometer, and in such circumstance the bridge remains balanced. There is no positive electrical potential at terminal 55 since it is at ground potential equal to terminal 54. Accordingly, under normal conditions of operation the resistances of the thermistor and of the potentiometer match one another, the electrical bridge is balanced and no opportunity is afforded for gate voltage to flow to the SCR device 63.

It may be that coolant will leak out of the system, causing the charge to fall below a specified tolerance level. When this occurs the potentiometer and thermistor resistances will differ because the piston position will not reflect that position commensurate with the temperature sensed by the thermistor. Hence, there will be an unbalanced bridge. Voltage will be applied to the gate 64 of the SCR device, current will flow in the conductor 61 and light 62 will come on. An observer is warned thereby of a low charge condition in the coolant system.

It will be understood, in connection with the foregoing, that, at the so-called charge point at which the electrical bridge is balanced and light 62 extinguished, piston 32 occupies a position in the accumulator proper for existing coolant temperature. The parts will be constructed and arranged to insure that at such charge point the piston has a range of movement adequate to maintain the coolant system pressurized throughout a given range of temperature values.

The resistance-temperature characteristics of the thermistor 45 may be reversed so that electrical resistance decreases with temperature increase. In such event the location of potentiometer lead 43 will be changed to attach relatively remotely from piston 41, with resistance decreasing as fluid density decreases due to temperature rise.

Under some conditions, it may be desirable to signal an over charge of the coolant system. This may be done by an addition to the basic control circuit, as in the manner diagrammatically illustrated in FIG. 3. In FIG. 3, the components identical to FIG. 2 components are given the same number with the addition of subscript "a" and these parts operate in the same manner to the same end as described in connection with claim 2. The additions to FIG. 3 include a line 65 extending from terminal 47a to ground 66, beyond a resistor 67. In line 65 a conductor 68 is attached leading to gate 64a of the SCR device 63a. In the conductor 68 is a PNP transistor switch device 69, a resistor 71 and a diode 72. In addition, a branch line 73 of conductor extension 57a leads to a base 70 of switch device 69.

The PNP transistor device interconnects what may be termed "emitter" and "collector" portions of conductor 68. It has characteristics that it conducts only if a negative electrical signal is present at the base 70 of the device. When the device starts conducting, the current flow is from the "emitter" above the device to the "collector," below it.

According to this construction and arrangement of parts, the supplemental means represented by conductor 68 for applying gate voltage to the SCR device 63a is inactive when the coolant system is under charged or when the system is at the charge point since the potentiometer resistance under these conditions does not exceed the thermistor resistance. As such a positive signal is present at 55a which does not let the transistor 69 conduct. In the event of an over charge, however, piston 32 is displaced an amount excessive considering the existing fluid temperature. Potentiometer resistance accordingly becomes greater than thermistor resistance.

As the potentiometer 40a resistance exceeds the thermistor 45a resistance a negative potential appears at the junction 55a of the bridge. With negative potential at 55a, base 70 of the transistor 69 is also at a negative potential. This negative potential turns the transistor on and a current flow results across device 69. As a result there is a positive signal at the gate 64a of the SCR 63a, which makes the SCR a conductor. Light 62 is illuminated and an over charge indicated. Accordingly, in the charging process should charging be continued beyond the charge point this condition will be signaled first by the light 62 going out as the charge point is reached and then by the light re-igniting as the charge point is exceeded.

Modifications in structural details of the invention are, of course, possible it being intended tat the invention should be limited only as indicated in attached claims.

What is claimed is:

1. In a fluid flowing system, an accumulator apparatus useful in applying pressure to the system and to accommodate fluid expansion over a wide range of ambient temperatures, said accumulator communicating with the system and containing a resiliently biased piston the position of which in the accumulator is a function of fluid temperature, said piston having a position indicating a properly charged system for any given fluid temperature; follower means for said piston; fluid temperature sensing means; said follower means being a potentiometer and said sensing mean being a thermistor, each reflecting an electrical resistance which is a function of fluid temperature; an electrical bridge circuit incorporating said potentiometer and said thermistor and inducing a signaling current flow in the absence of balancing resistances; and another electrical circuit containing indicator means energized by current flow through said other circuit, said other circuit further containing a Silicon Controlled Rectifier device normally deactivated and blocking current flow through said other circuit, the induced signaling current flow from said electrical bridge being applied as gate voltage to said Silicon Controlled Rectifier device for actuating thereof.

2. Accumulator apparatus according to claim 1, wherein the potentiometer includes a slider member fixed to move with said piston and coil means fixed to a relatively stationary part of the accumulator to be traversed by said slider.

3. Accumulator apparatus according to claim 1, wherein said piston forms in said accumulator a pressure chamber, said thermistor being installed in said accumulator to extend into and sense the temperature of the fluid in said chamber.

4. A remote charge indicator for use in connection with an accumulator-reservoir device in a fluid flowing system, the accumulator-reservoir device embodying a pressure applying piston; including an electrical control circuit comprising a bridge made up of a potentiometer a slider member of which is in a following relation to said piston and made up further of a thermistor sensing fluid temperature, said potentiometer and said thermistor both exhibiting resistances which are functions of fluid temperature, said potentiometer and said thermistor being in different legs of said bridge which is further made up of matched resistors, said bridge being balanced when the resistance of said potentiometer and of said thermistor are substantially the same for zero current flow across said bridge, said bridge being unbalanced by said piston assuming a position indicating a fluid temperature either higher or lower than actual fluid temperature, a current flow being generated across said bridge in response to unbalancing thereof, and means utilizing said generated current flow as a control to indicate that the fluid system is less than fully charged or has failed to remain so.

5. A remote charge indicator according to claim 4, characterized by an indicator circuit containing a Silicon Controlled Rectifier device, the generated current flow from said bridge being applied as gate voltage to said Silicon Controlled Rectifier device.

6. A remote charge indicator according to claim 5, wherein said indicator circuit further includes energizable means deenergized in a balanced condition of said bridge.

7. A remote charge indicator according to claim 4, wherein said bridge generates said current flow in either an under charged or an over charged condition of the system.

* * * * *